United States Patent
Sassi

(10) Patent No.: US 6,702,294 B2
(45) Date of Patent: Mar. 9, 2004

(54) SEAL UNIT FOR MECHANICAL MEMBERS ROTATING RELATIVE TO EACH OTHER, IN PARTICULAR FOR FOUNDRY ROLLERS

(75) Inventor: Mauro Sassi, Moncalieri (IT)

(73) Assignee: RFT S.p.A., Turin (IT)

( * ) Notice: Subject to any disclaimer, the term of this patent is extended or adjusted under 35 U.S.C. 154(b) by 0 days.

(21) Appl. No.: 09/986,785

(22) Filed: Nov. 9, 2001

(65) Prior Publication Data

US 2002/0063393 A1 May 30, 2002

(30) Foreign Application Priority Data

Nov. 9, 2000 (IT) ..................................... MI2000A2426

(51) Int. Cl.⁷ .............................................. F16J 15/32
(52) U.S. Cl. ........................ 277/572; 277/551; 277/562; 277/564
(58) Field of Search ................................ 277/549, 551, 277/562, 564, 572, 573, 575–577

(56) References Cited

U.S. PATENT DOCUMENTS

| | | | | |
|---|---|---|---|---|
| 2,167,603 A | * | 7/1939 | Victor ............................. 288/3 |
| 2,185,790 A | * | 1/1940 | Kosatka et al. ............. 277/562 |
| 2,350,697 A | * | 6/1944 | Petch .......................... 277/553 |
| 3,099,454 A | * | 7/1963 | Walinsky .................... 277/570 |
| 3,207,521 A | * | 9/1965 | Dega ........................... 277/568 |
| 3,275,331 A | * | 9/1966 | Mastrobattista et al. .... 277/309 |
| 3,395,950 A | * | 8/1968 | Brandt ........................ 384/148 |
| 3,575,426 A | * | 4/1971 | Durham ....................... 277/432 |
| 3,682,488 A | * | 8/1972 | Matsushima ................. 277/551 |
| 3,761,099 A | * | 9/1973 | Hansson ...................... 277/351 |
| 3,771,799 A | * | 11/1973 | Sekulich et al. .............. 277/65 |
| 3,871,666 A | * | 3/1975 | Franz et al. ................. 277/563 |
| 4,126,316 A | | 11/1978 | Cather, Jr. |
| 4,405,135 A | * | 9/1983 | Ries ........................... 277/551 |
| 4,721,314 A | * | 1/1988 | Kanayama et al. ......... 277/152 |
| 4,848,776 A | * | 7/1989 | Winckler ...................... 277/23 |
| 5,009,435 A | * | 4/1991 | Villanyi et al. ............... 277/23 |
| 5,582,412 A | * | 12/1996 | Sabo Filho .................. 277/37 |
| 6,102,409 A | * | 8/2000 | Furuyama et al. .......... 277/562 |
| 6,220,600 B1 | * | 4/2001 | Tripathy et al. ............ 277/309 |
| 6,315,296 B1 | * | 11/2001 | Oldenburg ................... 277/353 |

* cited by examiner

*Primary Examiner*—Anthony Knight
*Assistant Examiner*—Michael J. Kyle
(74) *Attorney, Agent, or Firm*—Burns, Doane, Swecker & Mathis, LLP

(57) ABSTRACT

Seal unit for mechanical members rotating relative to each other, in particular foundry rollers, including a tubular member which can be fitted on a first of said rotating members, a first and a second annular sealing member surrounding the tubular member and provided with a first and a second fitting support respectively and corresponding sealing rings of elastomer material. The seal unit also includes an annular spacer member coaxial with the tubular member and acting together with the first and the second support to keep the first and second annular sealing members in their corresponding working positions.

19 Claims, 1 Drawing Sheet

SEAL UNIT FOR MECHANICAL MEMBERS ROTATING RELATIVE TO EACH OTHER, IN PARTICULAR FOR FOUNDRY ROLLERS

This invention relates to a seal unit for mechanical members rotating relative to each other, in particular to foundry rollers.

BACKGROUND OF THE INVENTION

As is well known, the construction of seal units for members which rotate relative to each other working under particular environmental conditions can give rise to difficulties.

In foundries, for example, solidified material from continuous casting can be transported by means of a plurality of rollers arranged in succession and connected to corresponding shafts through bearings. At their respective ends the rollers are provided with seal units which limit losses of lubricants through the bearings.

Mainly because of the high operating temperatures, special construction arrangements have to be provided for. In more detail, these seal units normally comprise a bush fitted to the corresponding shaft and a plurality of radial metal partitions forming labyrinths between the seat of the bearing and the exterior. Given that labyrinths offer a high level of hydraulic resistance, when the rollers are set in motion the lubricant is retained within the seat of the bearing.

Known sealing units however have some disadvantages, mainly due to the fact that the labyrinths nevertheless permit continuous although limited leakage of lubricant. For this reason it is in fact necessary to provide a pumping unit which makes up for the lubricant which escapes.

Furthermore, lubricant consumption is enormous in that losses cannot be recovered and replaced between the moving parts. In fact, in the course of transport on the rollers, the cast material is cooled with a spray of water and the lubricant which escapes therefore mixes with the cooling water, becoming unusable. Also the disposal of large quantities of lubricant represents a serious disadvantage, from the economic point of view, and also because of the fact that it has an appreciable environmental impact.

A further disadvantage arises from the fact that slag and impurities can enter into the labyrinth passages while in operation, reaching the moving parts and damaging them.

SUMMARY OF THE INVENTION

The purpose of this invention is to provide a seal unit which does not have the disadvantages described and which in particular prevents the escape of lubricant under normal conditions of use.

In accordance with this invention a seal unit is constructed for mechanical members which rotate with respect to each other, in particular foundry rollers, comprising a tubular member which can be fitted to a first of said rotating members, characterised in that it comprises a first and a second annular sealing member surrounding said tubular member and provided with a first and second mounting support respectively and corresponding sealing rings of elastomer material, and in that it comprises an annular spacing member coaxial with said tubular member and acts together with said first and second supports to hold said first and second annular sealing members in their respective working positions.

The use of sealing rings of elastomer material makes it possible to achieve an optimum seal and avoid losses of lubricant, which do not therefore have to be made up. As a consequence an appreciable reduction is achieved in the consumption of lubricant and, in addition to this, the need for continuous lubrication of the moving members is overcome. It is therefore possible to achieve appreciable advantages in economic terms and in terms of environmental impact, given that the quantity of lubricant mixed with water which has to be disposed of is considerably reduced. The use of seal units according to the invention is therefore particularly advantageous in that it makes it possible to eliminate the lubricant pumping unit.

Furthermore, the elastomer sealing rings protect the moving members from the accidental ingress of slag, reducing the risk of damage. In a preferred embodiment the seal unit comprises a screen fitted to said first rotating member and placed in contact with said second annular sealing member on the side opposite said first annular sealing member. This makes it possible to further reduce the risk that slag or impurities will reach the moving members.

A further advantage is provided by the fact that the seal unit can easily be mounted in its own working seat. In fact the first and the second annular sealing members assembled with the annular spacer member constitute a seal unit which in turn forms a single assembly with the tubular body. The seal unit can therefore be preassembled and subsequently inserted into its seat in a single operation.

BRIEF DESCRIPTION OF THE DRAWING

For a better understanding of the invention, an embodiment is described below purely by way of a non-restrictive example with reference to the FIGURES in the appended drawing, which illustrates a view of a seal unit according to this invention in side elevation in cross-section along an axial plane.

DETAILED DESCRIPTION OF THE INVENTION

Figure 1:
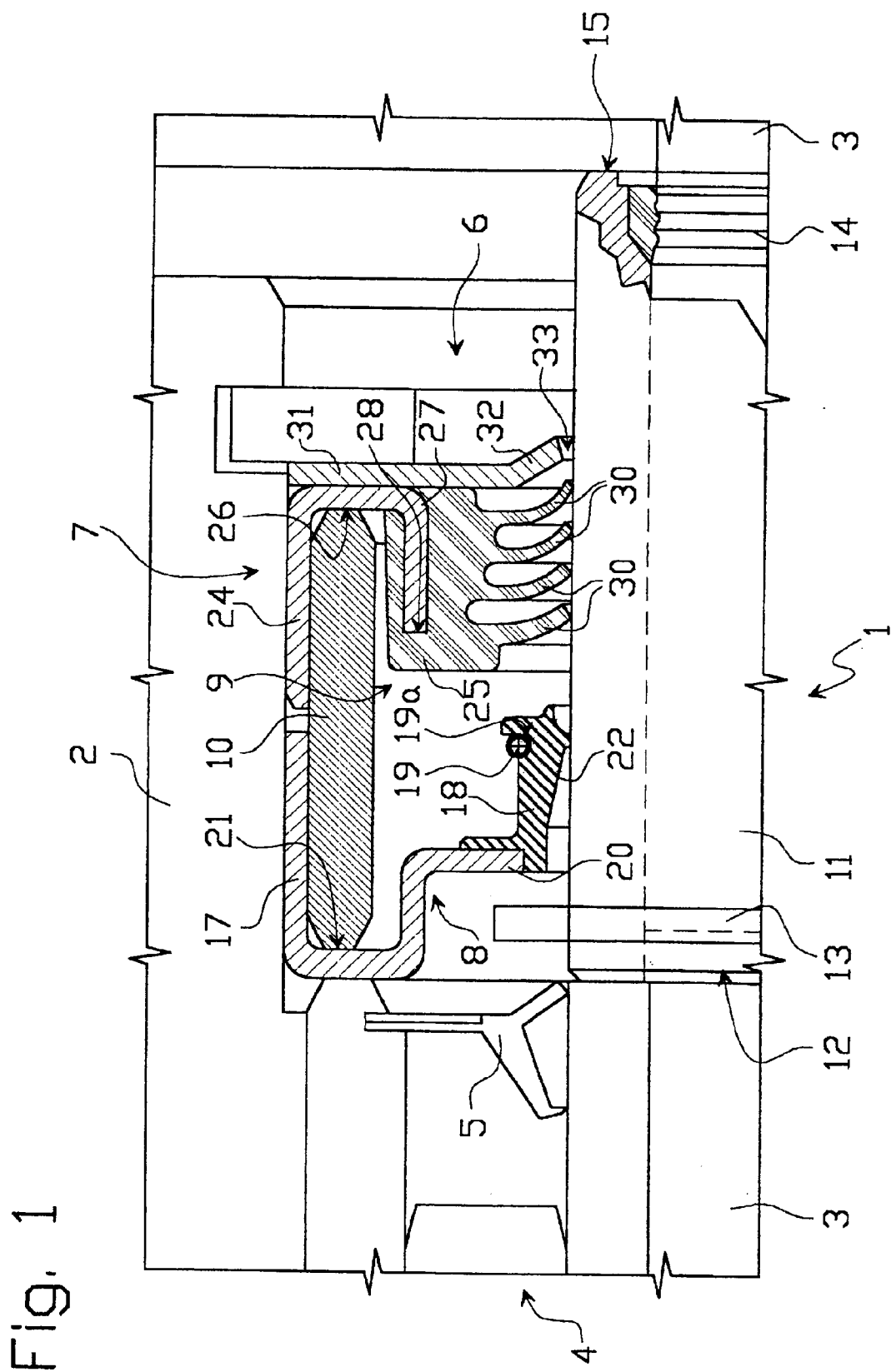

With reference to the aforesaid FIGURE, number 1 indicates as a whole a seal unit for two mechanical members which are rotating relative to each other. In particular, seal unit 1 may be used for a system for the transport of solidified castings in continuous casting foundries. In this case a plurality of rollers 2 (of which for convenience only one is illustrated in the FIGURE) are mounted side by side so that they idle on a shaft 3 in an arrangement which is in itself known. Furthermore each roller 2 is coupled to shaft 3 by means of its corresponding roller bearing 4, of a known type and preferably comprising an incorporated sealing member 5.

Seal unit 1 is fitted with an interference fit to cylindrical seat 6 formed between roller 2 and shaft 3 and comprises a seal unit 7 fitted onto a bush 11 and in turn incorporating a first and a second annular sealing member 8, 9 and an annular spacer member 10.

Bush 11 is fitted rotatably onto shaft 3 and has at one of its ends 12 a flange 13 capable of forming a stop for fitting seal unit 1. A static sealing member 14 of substantially annular shape is placed between bush 11 and shaft 3 at a second end 15 of said bush 11.

First annular sealing member 8 comprises a first mounting support 17 formed of a sheet of metal having a portion which is bent back in such a way as to form a first circular groove 21, and a first sealing ring 18 of elastomer material.

First sealing ring 18 is supported by an inner edge 20 of said first mounting 17, for example bonded during a vulcanising stage, and extends axially from the inside edge 20 of the band opposite flange 13 and has a first radial sealing lip 22 which is substantially V-shaped.

A spring 19, for example of the garter type, is housed in an annular groove 19a in first sealing ring 18, adjacent to first radial sealing lip 22 in such a way as to spring-load first sealing ring 18 and establish a predetermined sealing pressure.

Second annular sealing member 9 comprises a second mounting 24 formed from a metal sheet and a second sealing ring 25 of elastomer material. Second mounting 24 has a portion bent so as to form a second circular groove 26.

Second sealing ring 25 is provided with a plurality of second radial sealing lips 30 which extend towards the interior of said ring and has a seat 28 engaged by an inner edge 27 of the bent portion of second mounting 24. Second sealing ring 25 is bonded to second mounting 24 during a stage of vulcanising and when in use is inserted on bush 11 with a predetermined radial interference fit. In addition to this the second radial sealing lips are pressed from the side opposite annular sealing member 8.

In this way the lubricant (e.g. grease) can be effectively retained within bearing 4, avoiding losses under normal operating conditions. Furthermore the orientation of first and second radial sealing lips 22, 30 makes it possible to relieve any excess pressures which might damage the mechanical parts and/or the sealing members.

First and second annular sealing members 8, 9 are mounted coaxially with an interference fit on annular spacer member 10 in such a way that the opposite edges of annular spacer 10 are inserted into first and second circular grooves 21, 26 respectively. In practice, annular spacer member 10 makes it possible to keep first and second annular sealing members 8, 9 in their respective working positions relative to each other, both radially and axially. Furthermore, annular spacer member 10 is substantially undeformable and makes it possible to fit seal unit 1 to cylindrical seat 6 by means of an interference fit.

Seal unit 1 also comprises a screen 31 fitted to bush 11 in contact with second annular sealing member 9 on the side opposite first annular sealing member 8.

Screen 31, which for example comprises a washer, has a radially inner region 32 of substantially frustoconical shape which extends axially on the side opposite second annular sealing member 9. Bush 11 and screen 31 define an annular opening 33 which has a predetermined radial dimension.

An outer diameter of screen 31 is instead substantially equal to the diameter of cylindrical seat 6 so that it can be inserted with an interference fit, or alternatively welded.

In this way the screen protects seal unit 7 from any infiltration by slag, while at the same time providing for the relief of internal excess pressures.

Finally it is obvious that modifications and variants may be applied to the seal unit described without going beyond the scope of this invention.

What is claimed is:

1. Seal unit for mechanical members rotatable with respect to each other, in particular for foundry rollers, comprising a tubular member which can be fitted onto a first of said rotating members, a first and a second annular sealing member surrounding said tubular member and provided with a first and a second mounting support respectively and corresponding sealing rings of elastomer material, and an annular spacing member which is coaxial with said tubular member and acts together with said first and second mounting supports to hold said first and second annular sealing members in their respective working positions, said first and second mounting supports each having respective portions which are bent back to form respective circular grooves which receive opposite edges of said annular spacing member.

2. Seal unit according to claim 1, wherein said sealing ring of said first annular sealing member has a first radial lip which is substantially V-shaped, and said first annular sealing member also comprises spring-loading means.

3. Seal unit according to claim 1, wherein said sealing ring of said second annular sealing member has a plurality of second radial sealing lips.

4. Seal unit according to claim 3, wherein the sealing ring of said second annular sealing member is mounted on said tubular member with a predetermined radial interference fit, and second radial sealing lips are bent back on a side opposite said first annular sealing member.

5. Seal unit according to claim 1, including a screen fitted onto said tubular member and in contact with said second annular sealing member on a side opposite said first annular sealing member.

6. Seal unit according to claim 5, wherein said screen comprises a washer having a radially inner region of a substantially frustoconical shape and extending axially on a side opposite said second annular sealing member, said tubular member and said washer defining an annular opening having a predetermined radial dimension.

7. Seal unit according to claim 1, including static sealing means placed between one end of said tubular member and said first rotating member.

8. Foundry roller comprising a shaft, at least one (cylindrical member coupled to said shaft by a bearing, and at least one seal unit housed in a cylindrical seat defined between said shaft and said cylindrical member; the seal unit comprising a tubular member fitted on the shaft, first and second annular sealing members surrounding the tubular member and provided with a first and a second mounting support respectively and corresponding sealing rings of elastomer material, the first and second mounting supports being separate from one another, an annular spacing member coaxial with the tubular member and acting together with the first and second mounting supports to hold the first and second annular sealing members in their respective working positions.

9. Foundry roller according to claim 8, wherein the sealing ring of the second annular sealing member is mounted on the tubular member with a predetermined radial interference fit, and the sealing ring of the second annular sealing member being radial sealing lips bent back on a side opposite the first annular sealing member.

10. Foundry roller according to claim 8, wherein the first and second mounting supports each have a portion bent back to form respective circular grooves that receive opposite edges of the annular spacer member.

11. Foundry roller according to claim 8, wherein the first mounting support and the sealing ring of the first annular sealing member are formed separately from one another, and the second mounting support and the sealing ring, of the second annular sealing member are formed separately from one another.

12. Foundry roller according to claim 8, wherein the first mounting support and the sealing ring of the first annular sealing member are made of different materials, and the second mounting support and the sealing ring of the second annular sealing member are made of different materials.

13. Foundry roller according to claim 8, wherein the annular spacing member is separate from both the sealing ring of the first annular sealing member and the sealing ring of the second annular sealing member.

14. Foundry roller according to claim 8, wherein the annular spacing member that holds both the first and second annular sealing members in their respective working positions is a one-piece annular spacing member.

15. Seal unit for first and second mechanical members adapted to rotate with respect to each other, comprising a tubular member adapted to be fitted onto the first mechanical member, a first and a second annular sealing member surrounding said tubular member, the first annular sealing member being provided with a first mounting support and the second annular sealing member being provided with a second mounting support, said first and second annular sealing members being provided with respective sealing rings of elastomer material, an annular spacing member coaxial with the tubular member and acting together with the first and second mounting supports to hold the first and second annular sealing members in their respective working positions, the first and second mounting supports each having respective portions which are bent back to form respective circular grooves receiving opposite edges of the annular spacing member.

16. Seal unit according to claim 15, wherein the annular spacing member is separate from both the sealing ring of the first annular sealing member and the sealing ring of the second annular sealing member.

17. Seal unit according to claim 15, wherein the annular spacing member that holds both the first and second annular sealing members in their respective working positions is a one-piece annular spacing member.

18. Seal unit according to claim 1, wherein the first mounting support and the sealing ring of the first annular sealing member are formed separately from one another, and the second mounting support and the sealing ring of the second annular sealing member are formed separately from one another.

19. Seal unit according to claim 1, wherein the first mounting support and the sealing ring of the first annular sealing member are made of different materials, and the second mounting support and the sealing ring of the second annular sealing member are made of different materials.

* * * * *